United States Patent
Coffman et al.

(10) Patent No.: US 6,799,169 B1
(45) Date of Patent: Sep. 28, 2004

(54) METHOD AND SYSTEM FOR MODELESS OPERATION OF A MULTI-MODAL USER INTERFACE THROUGH IMPLEMENTATION OF INDEPENDENT DECISION NETWORKS

(75) Inventors: Daniel M. Coffman, Bethel, CT (US); Popani Gopalakrishnan, Yorktown Heights, NY (US); Ganesh N. Ramaswamy, Ossining, NY (US); Jan Kleindienst, Kladno-Krochehlavy (CZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,744

(22) Filed: Aug. 13, 1999

(51) Int. Cl.[7] .......................... G06F 17/00; G06F 17/20
(52) U.S. Cl. .............................. 706/11; 706/12; 706/45
(58) Field of Search .............................. 706/11, 12, 45

(56) References Cited

U.S. PATENT DOCUMENTS 6,292,779 B1 * 9/2001 Wilson et al. .............. 704/257

OTHER PUBLICATIONS

Papineni et al., "Free–Flow Dialog Management Using Forms," Eurospeech, Budapest, Hungary, Sep. 1999.
Lamel et al., "The LIMSI ARISE System for Train Travel Information," International Conference on Acoustics, Speech and Signal Processing, Phoenix, Arizona, Mar. 1999.
Ward et al., "Towards Speech Understanding Across Multiple Languages," International Conference on Spoken Language Processing, Sydney, Australia, Dec. 1998.

* cited by examiner

Primary Examiner—Anthony Knight
Assistant Examiner—Joseph P Hirl
(74) Attorney, Agent, or Firm—F. Chau & Associates, LLC

(57) ABSTRACT

A method and system for modeless operation of a multi-modal user interface through implementation of independent decision networks includes presenting a command to a dialog manager and comparing the command to a table of decision networks to determine if a corresponding decision network entry exists. The dialog manager creates a new instance of a decision network when a corresponding decision network entry is found. The new instance of the decision network is traversed in an isolated thread of execution such that a plurality of decision networks of a same instance or different instances may be active simultaneously. The new instance of the decision network is executed responsive to the command.

23 Claims, 5 Drawing Sheets

METHOD AND SYSTEM FOR MODELESS OPERATION OF A MULTI-MODAL USER INTERFACE THROUGH IMPLEMENTATION OF INDEPENDENT DECISION NETWORKS

BACKGROUND OF THE INVENTION

1. Field of the Invention

The present invention relates to dialog management for conversational speech systems, and more particularly to modeless operation of a conversational computer system with multiple applications.

2. Description of the Related Art

Conversational systems typically focus on the interaction with a single application at a time. A speaker for a conversational system is only permitted to interact with the active application. This type of interaction is generally referred to as a modal interaction or a modal system. That is, the user must specify which application he intends to use, and must finish working with that application before using another. This is disadvantageous in many situations where several applications may be needed or desired to be accessed simultaneously. Further, the conventional modal systems may result in loss of efficiency and time. In many instances, this leads to reduced profitability.

To illustrate a conventional modal system, a first task must be performed and closed prior to opening a second task and performing the second task. Conventional conversational modal systems are not capable of distinguishing tasks between applications. However, this is not how every day tasks are generally performed. In an office setting, for example, a worker might begin writing a letter, stop for a moment and place a telephone call, then finish the letter. The conventional modal systems do not provide this flexibility.

Therefore, a need exists for a system and method which includes a modeless conversational speech system which provides greater flexibility by controlling multiple applications concurrently. A further need exists for a system and method which employs information from applications and the user's actions to predict which applications the user will need.

SUMMARY OF THE INVENTION

A method, which may be implemented by a program storage device readable by machine, tangibly embodying a program of instructions executable by the machine to perform method steps for modeless operation of a multi-modal user interface through implementation of independent decision networks, includes presenting a command to a dialog manager and comparing the command to a table of decision networks to determine if a corresponding decision network entry exists. The dialog manager creates a new instance of a decision network when a corresponding decision network entry is found. The new instance of the decision network is traversed in an isolated thread of execution such that a plurality of decision networks of a same instance or different instances may be active simultaneously. The new instance of the decision network is executed responsive to the command.

In other methods, which may be implemented using the program storage device, the step of querying a user to provide input to resolve discrepancies in decision networks and input additional information may be included. The steps of requesting an instance of a decision network be created to provide a service, the requesting being initiated by another decision network, and/or requesting a plurality of instances of decision networks be created to provide a service, the requesting being initiated by the dialog manager may be included. The step of generating a record of activity by a decision network for the activity of that decision network may also be included. The command may be presented in a formal language such that a plurality of human utterances represent an action to be taken. The step of interfacing with at least one application to respond to the command may be included where the interfacing is initiated by at least one decision network.

A system for modeless operation of a multi-modal user interface, in accordance with the present invention, includes a user interface adapted for receiving commands and a dialog manager adapted to receive the commands from the user interface. A table of decision networks is stored in a memory. The table provides cross-references between commands and decision networks. A plurality of decision networks are responsive to the dialog manager. The dialog manager instantiates decision networks based on the table of decision networks to respond to the commands.

In alternate embodiments, the commands may include formal language commands or human utterances. The decision networks preferably include states and transitions between states. The states are capable of initiating actions. The dialog manager may be adapted to query and receive query responses pursuant to information needed by the decision networks. The plurality of decision networks may include an active state on an isolated thread of execution wherein any number of the decision networks are capable of simultaneously being in the active state.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
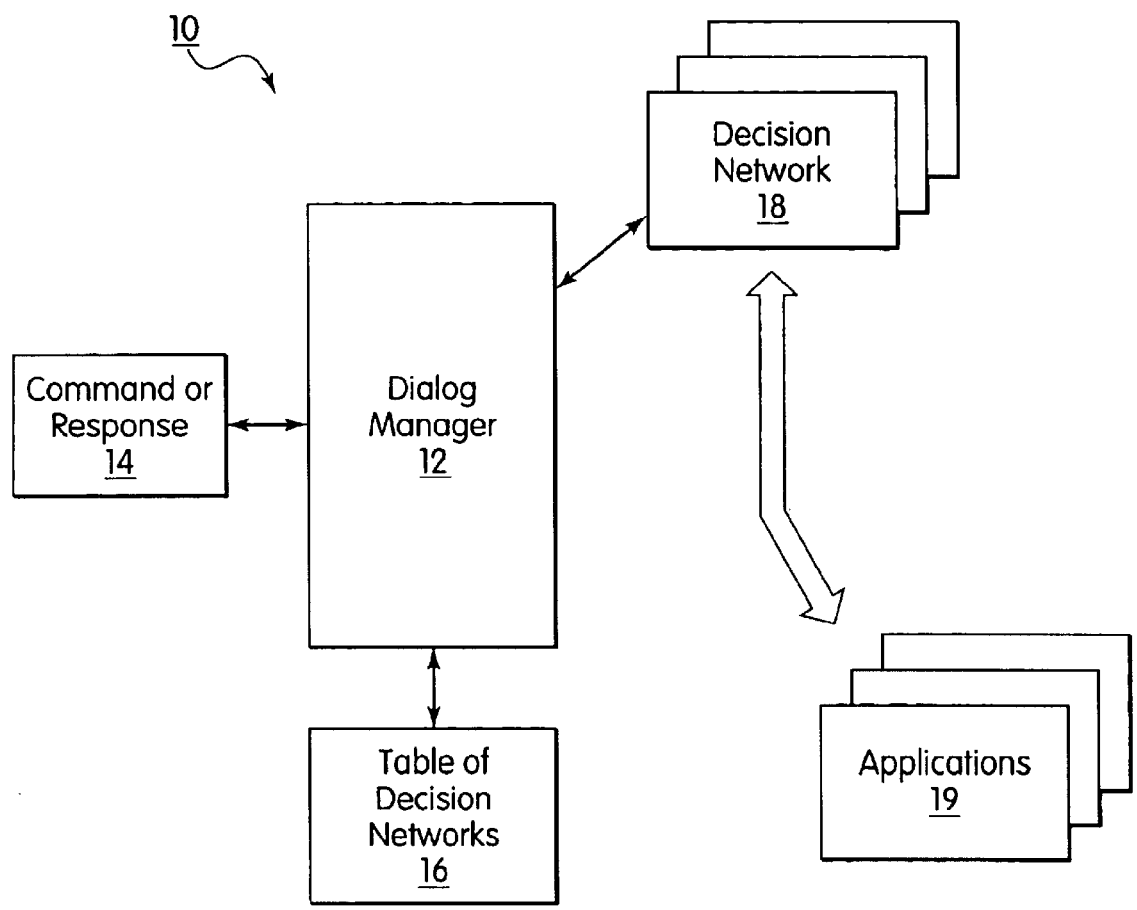
FIG. 1 is a block/flow diagram showing dialog manager interaction with decision networks in accordance with the present invention.

The present invention relates to dialog management for conversational speech systems, and more particularly to modeless operation of a conversational computer system with multiple applications. The present invention controls multiple applications through a conversational speech system, which manipulates information from applications, presents this information to the user, and converses with the user when some aspect of this manipulation is unclear or ambiguous. The present invention provides methods for modeless operation by which a user may begin working with one application, leave his work incomplete, work with another application, and then return to the first application.

The present invention is capable of supporting and interacting with any application a user may desire to use and allows the user to begin one or more operations with one or more applications, work with other applications, and then return to previous operations. This is completely different from the operation of most computer systems. With these, the user can only complete one task at a time, and as described above, this is usually not a very efficient use of resources.

It should be understood that the elements shown in FIGS. 1–5 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a conversational system 10 used to provide modeless operation in accordance with the present invention is shown. System 10 includes a dialog manager 12 which is responsive to a command or responsive to a command or response provided in block 14. A table of decision networks 16 is included which represents a plurality of decision networks 18. A command or response, from block 14, from the user is presented to the dialog manager 12 for processing. Block 14 may include an interface as described in commonly assigned U.S. Pat. No. 6,377,913, entitled "METHOD AND SYSTEM FOR MULTI-CLIENT ACCESS TO A DIALOG SYSTEM", filed concurrently herewith and incorporated herein by reference. In one embodiment, the command given to the dialog manager 12 is not the actual spoken command, but rather an element of a formal language representing the meaning of the command. In this manner, there may be many human utterances which convey the same meaning to the dialog manager 12. Alternatively, actual human language may be given as the command provided the dialog manager 12 is capable of handling this type of command. That is, the dialog manager can recognize spoken utterances. Illustratively, an actual form of this formal language may include "command(argumentl=valuel, . . . , argumentj=valuej)" where "command" represents the nature of the action to be taken or response, and "argument valuel=valuel" represents a qualifier to this command. In this manner, the utterance "Do I have anything scheduled for tomorrow?" would be transformed into the forma language "query_calendar(day=tomorrow)". The execution of a users command is initiated by the dialog manager 12. The command portion of the forma language is extracted and compared against the table of available decision networks 16. If a corresponding entry is found, the dialog manager 12 creates a new instance of a decision network 18. The table of decision networks 16 is not necessarily statically bound to the dialog manager 12. It may be modified at any time and different tables may be provided for the several users of the system 10. The decision network 18 selected in accordance with table 16 is traversed in its own thread of execution. Thus, multiple decision networks 18 may be active simultaneously, and as they are dynamically instantiated, several instances of the same network may even be active at the same time. It is this dynamic instantiation and the multi-threading that are needed to provide the desired modeless operation in accordance with this invention. The decision networks 18 may be though of as recipes for accomplishing a user's intended action. At each node of the network 18, the network 18 sends a query or command to an application 19, or poses a question to the user. The network 18 then awaits a response, and on the basis of this response, performs a transition to a new state or exits. The queries sent by the decision network 18 are requests for information necessary to the successful completion of the user's action, but this information is not necessarily of direct interest to the user. For example, if the user's utterance was "Change the subject of this message to 'Proposal'", the decision network implementing this command would first check to see if the current application in fact had a subject field. If it indeed has a subject field, this information would not be presented to the user. However, if the user's utterance was "Do I have any new mail?", the result of the query issued by the decision network would naturally be provided to the user. The commands issued by the decision network 18 may influence the state of the application. If the user were to say "Go to the next appointment", the application providing calendaring functions would, as the result of a method issued by the decision network 18, change its selected appointment to the next appointment within its list of appointments. Advantageously, this can be done while employing one or more different applications, for example, typing a letter in a word processing application, and employing a spreadsheet.

If the decision network 18 needs more information from the user, the decision network 18 presents a question to the user and awaits a response. In this case, the decision network 18 registers the type of responses it expects with the dialog manager 12, as described in commonly assigned U.S. application Ser. No. 09/374,374 entitled "METHOD AND SYSTEM FOR DETERMINING AND MAINTAINING DIALOG FOCUS IN A CONVERATIONAL SPEECH SYSTEM," filed concurrently herewith and incorporated herein by reference. The decision networks 18 act as finite state automata, and as such are independent agents. The decision networks 18 may interact with each other, and may even request that a new decision network be instantiated. An example of this behavior is the performance of the system 10 when the user responds in the positive to a "yes/no" question, i.e., the decision network 18 implementing the concept of "AFFIRMATION" will independently seek out that decision network which posed the question and deliver the affirmative result. A decision network 18 will ask that another network be created when it needs some subsidiary service. For example, if the user were to say "Send a new message to Mary" the decision network implementing the concept of "SEND_MAIL_MESSAGE" would request the help of a decision network implementing name resolution to resolve the full name and mail address of the person, Mary. The decision networks 18 may be terminated at any time by the dialog manager 12.

Figure 2:
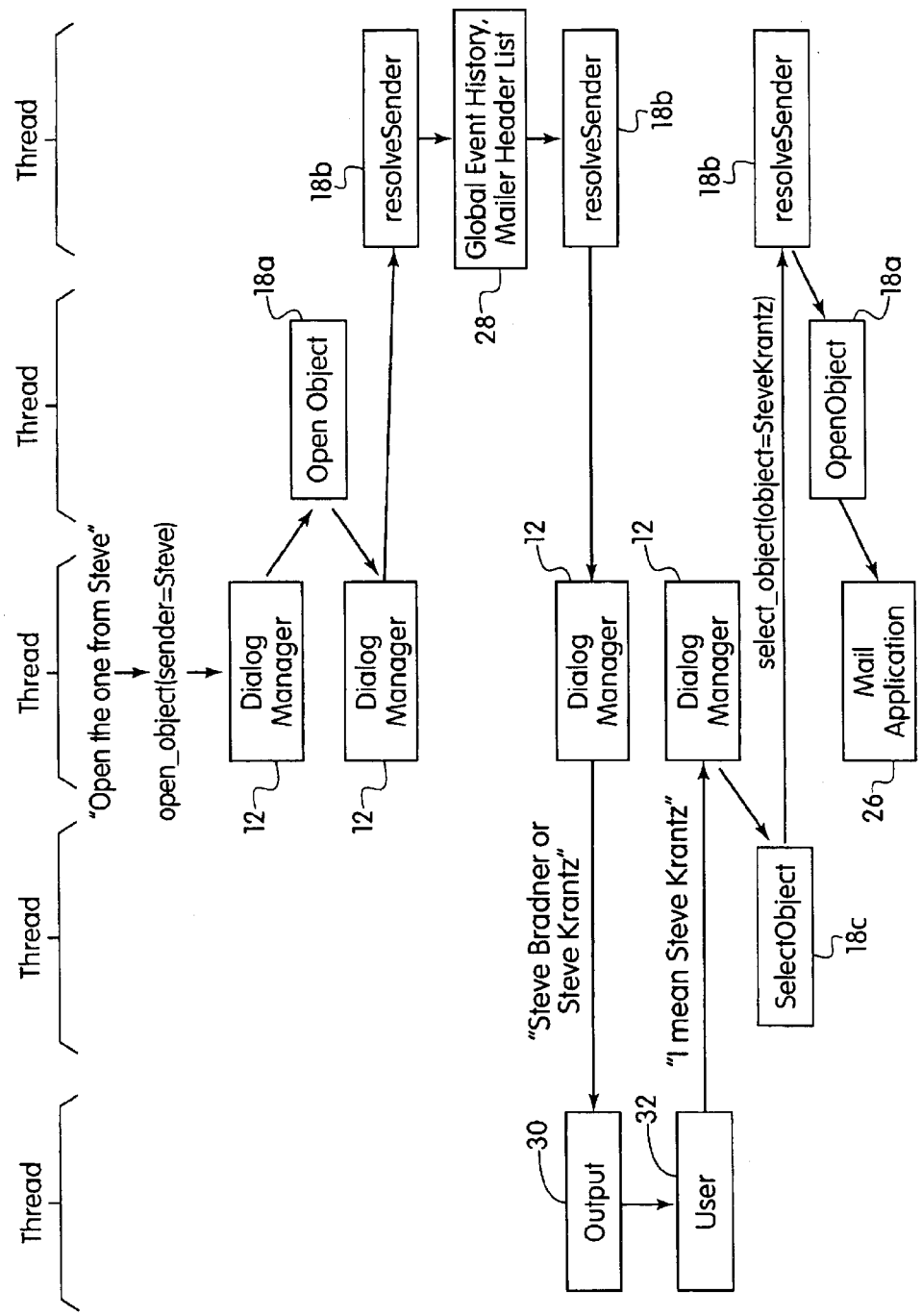
FIG. 2 illustratively depicts various threads of execution for a single command in accordance with the present invention.

Referring to FIG. 2, a flow chart showing modeless operation is illustratively shown. Modeless operation is provided by the present invention through the use of the decision networks 18 as independent automata. In FIG. 2, each vertical column represents a separate thread of execution. It is noted that the user interacts only with the dialog manager 12. Thus, for modeless operation, the dialog manager 12 remains available at virtually all times.

The action presented in FIG. 2 is initiated when the user says "Open the one from Steve". The formal language translation of this is "open_object(sender=Steve)". The dialog manager 16 examines its table of decision networks 16 (FIG. 1) and instantiates that network 18a implementing the concept of "OPEN_OBJECT". This network 18a examines the arguments passed to it, and requests that the dialog manager 12 create an instance of the resolveSender decision network 18b for resolving the name "Steve". This new decision network 18b performs its work in a separate thread of execution from either the dialog manager 12 or the original decision network 18a. The resolveSender decision network 18b makes use of names of senders in a mail application by sending a query to a mail application list 28. Decision network 18b further examines a multi-modal history 28 to see if there had been a previous reference to a person named "Steve". Suppose here that the resolveSender network 18b found two people named "Steve", say "Steve Krantz" and "Steve Bradner". This ambiguity must, of course, be resolved by the user. The resolveSender network 18b requests that the dialog manager 12 produce a prompt 30 to this effect for the user. Note that once this prompt 30 has been presented, the dialog manager 12 is again free. The user need not respond to the prompt 30, but may if he wishes perform some new, unrelated action, responding to the prompt 30 later, if at all.

After a user 32 responds with the utterance "I mean Steve Krantz" the action of open the message may proceed. The utterance is translated into the formal language "select_object(object=Steve Krantz )" (in block 14 of FIG. 1) and passed to the dialog manager 12. As before, the dialog manager instantiates a decision network 18c implementing this concept (i.e., select object). This new decision network 18c deduces that the resolveSender decision network 18b had posed the question initially, and passes the result to decision network 18c. Now the work of the resolveSender network 18b is completed and it returns the resolved name to the original OpenObject decision network 18a. The arguments originally given to this network 18a are now completely resolved so the network sends the desired command to a mail application 26. Subsequently it creates a record of what the decision network has done, including all of the steps in the resolution sequence. After each of the networks completes its appointed task, it exits, removing all trace of itself except for this record.

Figure 3:
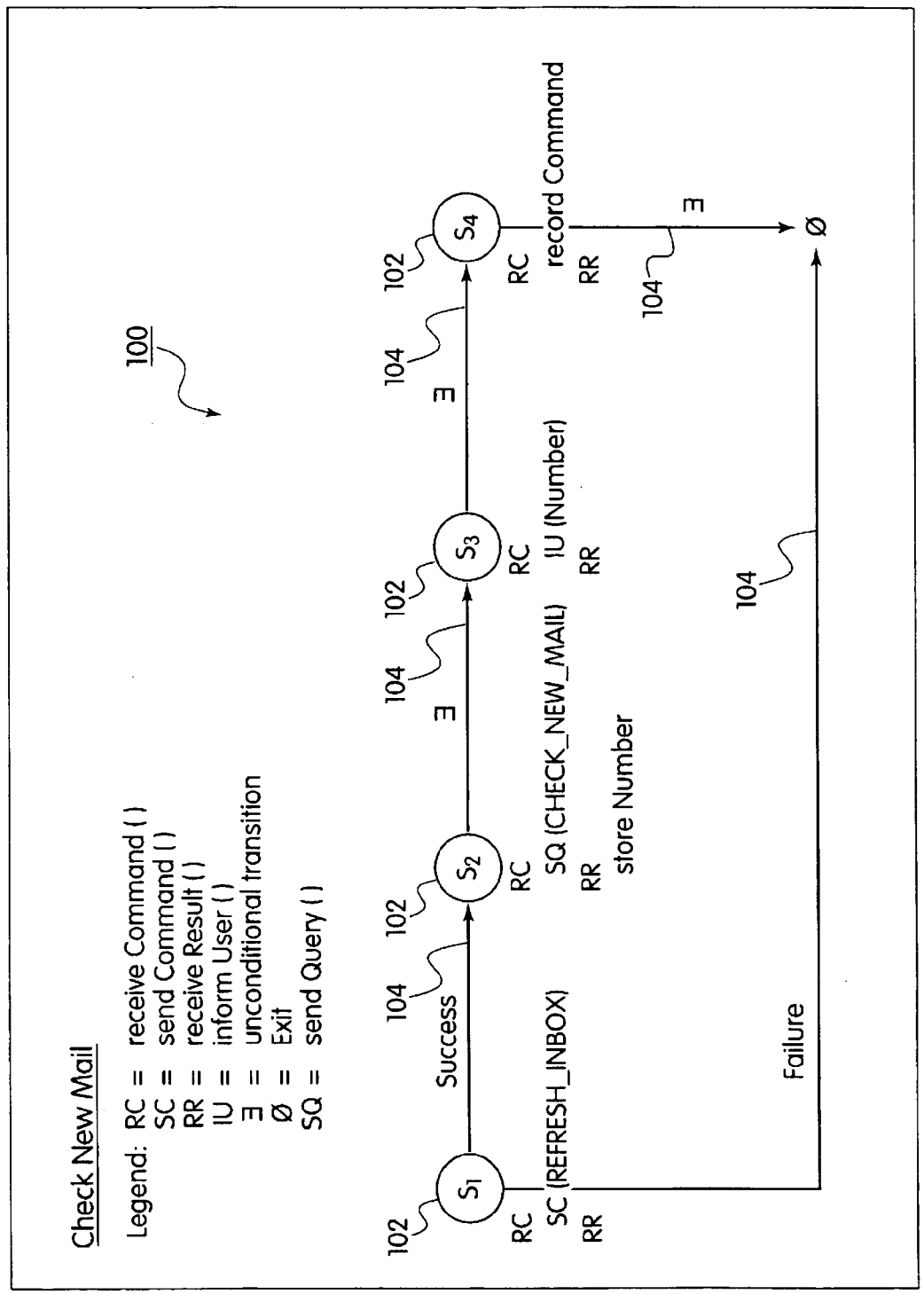
FIG. 3 is a schematic diagram illustratively showing a simple decision network in accordance with the present invention.

Referring to FIG. 3, a schematic diagram of a simple decision network 100 is illustratively shown. Here, states 102 of the network 100 are indicated by circles and transitions 104 are indicated by lines between states 102. Each state 102 of the decision network 100 implements two methods: receiveCommand and receiveResult. When the receiveCommand method is entered, the decision network 100 issues a query, command, or prompt as noted above. The method then awaits the result. Upon receipt of this result, the receiveResult method is entered. At this point, the network 100 examines the result and decides which state should be the next state (i.e., S2, S3, S4, etc.).

The decision network 100 implements the concept "CHECK_NEW_MAIL" which would used to act upon a user's utterance of the type "Please check my mail". The decision network 100 is entered at the state labeled S1. This state issues the command "REFRESH_INBOX" to a mail application (i.e., mail application 26 of FIG. 2). The result of this command will be either "Success" after the inbox is successfully refreshed, or "Failure". The receiveResult method in state S1 is entered. If the result is success, the next state will be S2. If it is not, the decision network 100 exits.

The receiveCommand in state S2 issues the command "CHECK_NEW_MAIL" to the mail application 26. The response will be the number of new messages. In the receiveResult method, this number is stored away and the next state will be S3. In this state's receiveCommand method a prompt encapsulating this number of new messages is generated and presented to the user. The next state will be S4 in which the decision network records what it has done. Subsequently the network 100 exits.

Figure 4:
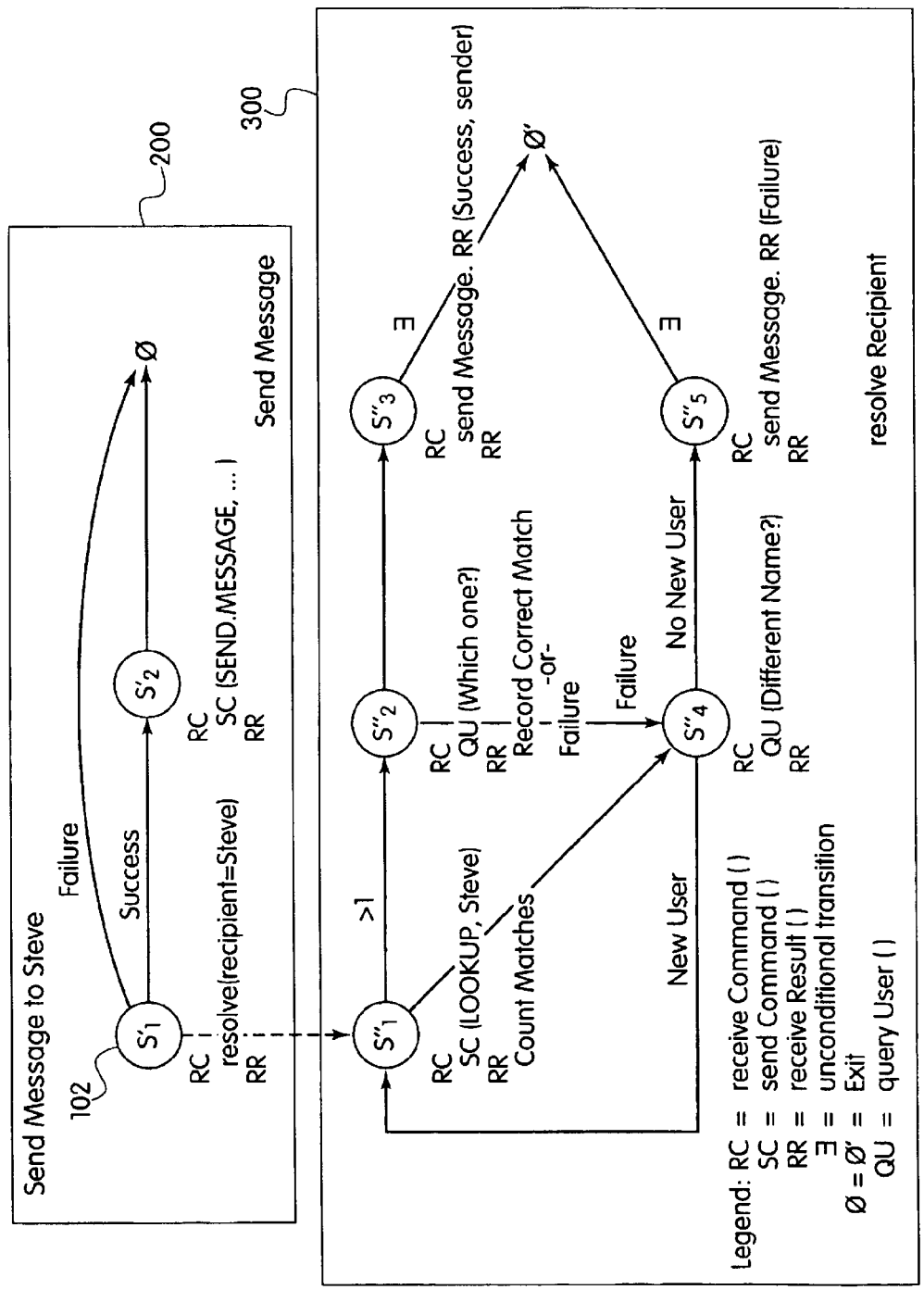
FIG. 4 is a schematic diagram illustratively showing interaction between two decision networks in accordance with the present invention.

Referring to FIG. 4, a schematic illustrates a set of two decision networks 200 and 300 performing the action corresponding to the utterance "Send a new message to Steve" which is translated to the formal language statement "send_message(recipient=Steve )". The action begins at state S1' in the sendMessage decision network 200. The receiveCommand (RC) method requests that the dialog manager 12 create an instance of the resolveRecipient (RR) decision network 300 to resolve the recipient's name. When decision network 300 finishes its work, it returns a result of "Success" or "Failure" to sendMessage decision network 200. Within the receiveResult method of S1', the next state is set to S2' if the result is "Success", otherwise the sendMessage decision network 200 exits. Within the receiveCommand (RC) method of S2', the command "SEND_MESSAGE" is sent to the mail application 26 (see FIG. 2) along with the previously resolved name of the intended recipient.

The action of the resolveRecipient decision network 300 begins at its state S1". The network 300 sends a command to the address book component "LOOKUP, Steve" and awaits the result which will be that there are no people named "Steve" in the address book, that there is exactly one, or that there are more than one. This result is examined within the receiveResult (RR) method of S1". For simplicity, the transition from state S1" to S3" which would be obtained in the case of exactly one person is not shown in FIG. 4.

If the address book was unable to provide the name of anyone named "Steve" a transition is made to state S4" where a question (QU) of the form "I could not find the address of Steve. Would you like to select someone else?" is posed to the user. If the user supplies the name of a new person, a transition is made to state S1", i.e., the initial state, and the resolution process begins again. If the user responds in the negative, a transition is make to state S5". Within state s5" the result "Failure" is returned to the waiting sendMessage decision network 200 and the resolveRecipient decision network 300 subsequently exits.

If the address book includes the names of more than one person named "Steve" the user must resolve this ambiguity. In this case, a transition is made to state S2" in which a query of the form "Do you mean Steve Krantz or Steve Bradner?" is presented to the user. If the user selects one of these choices, that choice is recorded and a transition is made to state S3" where the result "Success" and the resolved name are delivered to the sendMessage decision network 200. If the user does not select one of these names, perhaps because the name "Steve" was not the correct name to start with, a transition is made to state S4" so that the user may select a new name, as before.

Figure 5:
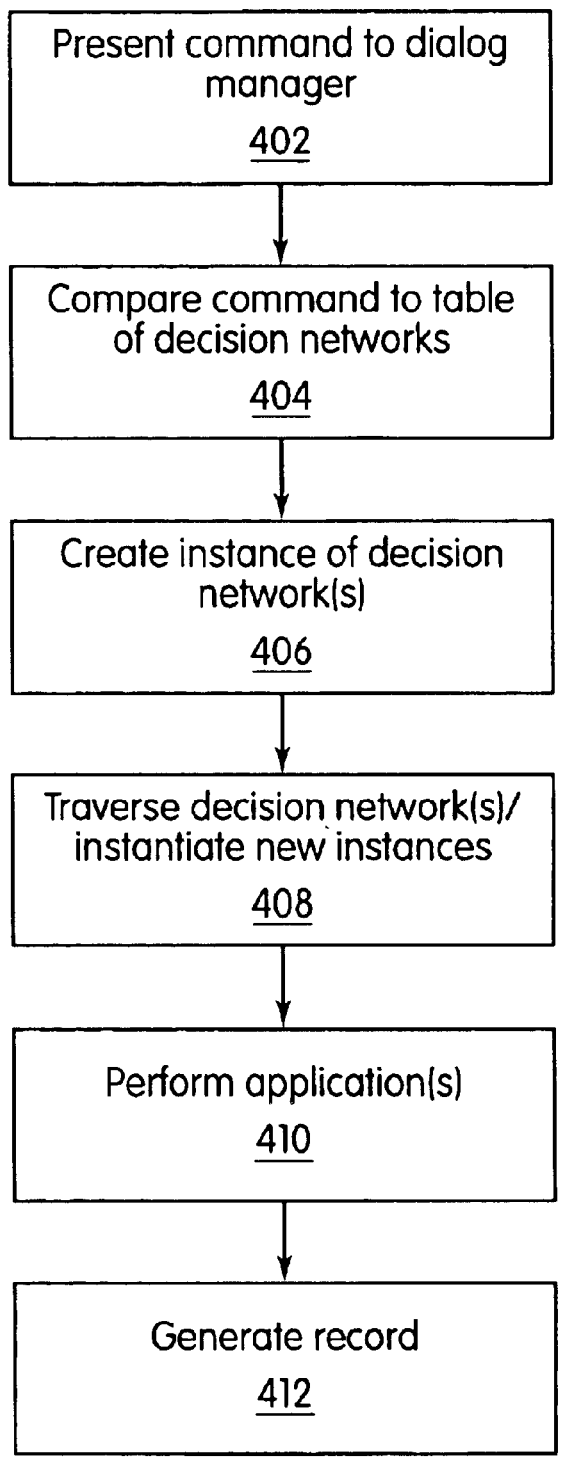
FIG. 5 is a block/flow diagram of a system/method for modeless operation in accordance with the present invention.

Referring to FIG. 5, a block/flow diagram is shown for a system/method in accordance with the present invention. The system/method may be implemented by a program storage device readable by machine, tangibly embodying a program of instructions executable by the machine to perform method steps for modeless operation of a multi-modal user interface through implementation of independent decision networks. In block 402, a command is present to a dialog manager by a user. The command is compared to a table of decision networks to determine if a corresponding decision network entry exists, in block 404. The dialog manager creates a new instance of a decision network when a corresponding decision network entry is found, in block

406. In block 408, the new instance of the decision network is traversed in an isolated thread of execution such that a plurality of decision networks of a same instance or different instances may be active simultaneously. Also, decision networks (or the dialog manager) may instantiate new instances for services needed by the active decision networks or for other commands of the user. In block 410, the new instance of the decision network is executed responsive to the command. This may be performed by calling one or more applications, requesting new information from the user, etc. In block 412, a record of activity is generated for each decision network's activity.

The present invention permits the modeless operation of a multi-modal user interface. With this invention, it becomes possible to perform several tasks simultaneously. Thus, a user can start one task, then start a second task without completing the first and later return to the first task. The tasks the user may perform are implemented as finite state automata. Each of these executes a decision network running within its own thread of execution. Each of these automata has access to the state information of the complete application, but acts independently. The present invention has been described in terms of an illustrative example involving identifying and sending a message. However, the present invention is much broader and may be used on any user interface platform with any number of different applications, for example, a calender application, a mail application, a spread sheet application, etc.

Having described preferred embodiments of a method and system for modeless operation of a multi-modal user interface through implementation of independent decision networks (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A computer implemented method for continuous process operation of user initiated interruptible tasks through implementation of independent automata with supporting applications, comprising the steps of:

presenting a request for the completion of a task to a dialog manager;

comparing the task to a table of available automata to determine if a corresponding automaton is defined;

creating an instance of the corresponding automaton when a corresponding table entry is found;

executing the instance of the corresponding automaton responsive to the task such that a plurality of other automata corresponding to a plurality of other tasks may be active simultaneously, wherein the plurality of other tasks are of the same type as and/or different type from the task; and completing the task, completing other running tasks, or interrupting the task, with the option to return and continue, while presenting a new request to the dialog manager.

2. The method as recited in claim 1, wherein executing the instance of the corresponding automaton responsive to the task, comprises the steps of:

providing instructions to the instance of the corresponding automaton of how to accomplish the task through a specifically crafted decision network; and executing these instructions independently of the plurality of other automata.

3. The method as recited in claim 1, further comprising the step of:

querying a user to provide input to resolve discrepancies and ambiguities and input additional information.

4. The method as recited in claim 1, further comprising the step of:

requesting an instance of an automaton be created to provide a service, the requesting being initiated by another automaton.

5. The method as recited in claim 1, further comprising the step of:

requesting a plurality of instances of automata be created to provide a service, the requesting being initiated by the dialog manager.

6. The method as recited in claim 1, further comprising the step of:

generating a record of activity by an automaton for the activity of that automaton.

7. The method as recited in claim 1, wherein the task is presented in a formal language such that a plurality of human utterances represents a set of tasks to be taken.

8. The method as recited in claim 1, further comprising the step of interfacing with at least one application to respond to the command, the interfacing being initiated by at least one automaton.

9. A program storage device readable by machine, tangibly embodying a program of instructions executable by the machine to perform method steps for continuous process operation of user initiated interruptible tasks through implementation of independent automata with supporting applications, the method steps comprising:

presenting a request for the completion of a task to a dialog manager;

comparing the task to a table of available automata to determine if a corresponding automaton is defined;

creating an instance of the corresponding automaton when a corresponding table entry is found;

executing the instance of the corresponding automaton responsive to the task such that a plurality of other automata corresponding to a plurality of other tasks may be active simultaneously, wherein the plurality of other tasks are of the same type as and/or different type from the task; and completing the task, completing other, running tasks, or interrupting the task, with the option to return and continue, while presenting a new request to the dialog manager.

10. The program storage device as recited in claim 9, wherein executing the instance of the corresponding automaton responsive to the task, comprises the steps of:

providing instructions to the instance of the corresponding automaton of how to accomplish the task through a specifically crafted decision network; and executing these instructions independently of the plurality of other automata.

11. The program storage device as recited in claim 9, further comprising the step of:

querying a user to provide input to resolve discrepancies and ambiguities and input additional information.

12. The program storage device as recited in claim 9, further comprising the step of:

requesting an instance of an automaton be created to provide a service, the requesting being initiated by another automaton.

13. The program storage device as recited in claim 9, further comprising the step of:
   requesting a plurality of instances of automata be created to provide a service, the requesting being initiated by the dialog manager.

14. The program storage device as recited in claim 9, further comprising the step of:
   generating a record of activity by an automaton for the activity of that automaton.

15. The program storage device as recited in claim 9, wherein the task is presented in a formal language such that a plurality of human utterances represents a set of tasks to be taken.

16. The program storage device as recited in claim 9, further comprising the step of interfacing with at least one application to respond to the command, the interfacing being initiated by at least one automaton.

17. A system for continuous process operation of user initiated interruptible tasks through implementation of independent automata with supporting applications comprising:
   a user interface adapted for receiving commands for the completion of a task;
   a dialog manager adapted to receive the commands from the user interface;
   a table of automata stored in a memory, the table providing cross-references between commands and automata; and
   a plurality of automata responsive to the dialog manager, the dialog manager instantiating automata based on the table of automata to respond to the commands to complete the task;
   wherein the task is completed, other running tasks are completed, or the task is interrupted, with the option to return and continue, while a new command is presented to the dialog manager.

18. The system as recited in claim 17, wherein the commands include formal language commands.

19. The system as recited in claim 17, wherein each of the plurality of automata includes states and transitions between states.

20. The system as recited in claim 19, further comprising a plurality of decision networks for instructing the plurality of automata to transition between the states, wherein the states initiate interface with the supporting applications.

21. The system as recited in claim 17, wherein the dialog manager is adapted to query and receive query responses pursuant to information needed by the automata.

22. The system as recited in claim 17, wherein the plurality of automata include an active state within an isolated thread of execution wherein a plurality of automata are capable of simultaneously being in the active state.

23. The system as recited in claim 17, wherein the commands include human utterances.

* * * * *